United States Patent
DeLapa, II (10) Patent No.: US 11,923,677 B2
(45) Date of Patent: Mar. 5, 2024

(54) CUSTOMIZABLE OVERCURRENT PROTECTION ASSISTANT

(71) Applicant: Joseph M. DeLapa, II, Proctorville, OH (US)

(72) Inventor: Joseph M. DeLapa, II, Proctorville, OH (US)

(*) Notice: Subject to any disclaimer, the term of this patent is extended or adjusted under 35 U.S.C. 154(b) by 592 days.

(21) Appl. No.: 17/148,763

(22) Filed: Jan. 14, 2021

(65) Prior Publication Data
US 2022/0224106 A1   Jul. 14, 2022

(51) Int. Cl.
*H02H 7/20*    (2006.01)
*G06F 9/451*   (2018.01)

(52) U.S. Cl.
CPC ............ *H02H 7/20* (2013.01); *G06F 9/451* (2018.02)

(58) Field of Classification Search
CPC ....................................................... H02H 7/20
See application file for complete search history.

(56) References Cited

U.S. PATENT DOCUMENTS

| | | | |
|---|---|---|---|
| 6,315,580 B1 | 11/2001 | Hurtubise et al. | |
| 6,530,811 B1 | 3/2003 | Padulo et al. | |
| 7,977,818 B1 | 7/2011 | Wahl | |
| 10,397,407 B1* | 8/2019 | Britt | H04M 7/0084 |
| 2003/0140344 A1 | 7/2003 | Bhatti | |
| 2008/0291607 A1* | 11/2008 | Braunstein | H01R 25/006 |
| | | | 361/601 |
| 2009/0293864 A1 | 12/2009 | Augenbraun et al. | |
| 2011/0308833 A1* | 12/2011 | West | H01L 31/02021 |
| | | | 174/59 |
| 2015/0077231 A1 | 3/2015 | Kang et al. | |
| 2019/0199263 A1* | 6/2019 | Li | H05K 1/0257 |
| 2023/0087598 A1* | 3/2023 | Lamer | H02J 3/381 |
| | | | 320/135 |
| 2023/0130052 A1* | 4/2023 | Shareef | G01R 31/327 |
| | | | 324/424 |

OTHER PUBLICATIONS

A. Tsimtsios and V. Nikolaidis, "Towards Plug-and-Play Protection for Meshed Distribution Systems with DG," in IEEE Transactions on Smart Grid, vol. 11, No. 3, pp. 1980-1995, May 2020.
OptiFuse, "Fuse Selection Guide", OptiFuse—Rev A Jan. 2010, 9 pages, https://www.optifuse.com/PDFs/FuseSelectionGuide_RevA.pdf, Jan. 2010.

* cited by examiner

*Primary Examiner* — Sisay G Tiku
(74) *Attorney, Agent, or Firm* — Levine's Tech Consulting LLC; Frank E. Levine (57) ABSTRACT

An approach is disclosed for assisting a user with configuring an integrated circuit in one or more boards with a customizable construction. A user interface (UI) is provided that allows a user to specify inputs to an apparatus. The apparatus being an enclosure for integrating attachable modular customizable solar energy components and where the components are coupled to the integrated circuit. The apparatus supports connecting user customizable plug and play components to the integrated circuit. Responsive to the user utilizing the UI by specifying inputs, the UI identifies requirements for overcurrent protection elements in the apparatus at a location in the apparatus where an overcurrent protection element meeting the requirements is inserted.

18 Claims, 7 Drawing Sheets

CUSTOMIZABLE OVERCURRENT PROTECTION ASSISTANT

BACKGROUND

The present invention relates to a computing environment, and more particularly to a computer program, method, and system supporting tailoring overcurrent protections based on user requirements.

SUMMARY

According to one embodiment of the invention, there is a method for assisting a user with configuring an integrated circuit in one or more boards with a customizable construction configured to integrate a solar generation system. A user interface (UI) is provided that allows a user to specify inputs to an apparatus. The apparatus being an enclosure for integrating attachable modular customizable solar energy components and where the components are coupled to the integrated circuit. The integrated circuit includes breakers and/or fuses customizable overcurrent protection elements. The apparatus supports connecting user customizable plug and play components to the integrated circuit. Responsive to the user utilizing the UI by specifying inputs, where the inputs include one or more overcurrent protection locations and information to determine amperage at the one or more overcurrent protection locations, the UI identifies requirements for at least one overcurrent protection elements in the apparatus at least one location in the apparatus where the at least one overcurrent protection element rated to achieve the identified requirements is installed.

According to one embodiment of the invention, there is provided an information handling system including at least one processor executing instructions implementing steps of the method that assists the user with configuring an integrated circuit with customizable overcurrent protection.

According to one embodiment of the invention, there is provided a computing program product executing instructions having the steps of the method that assists the user with configuring an integrated circuit with customizable overcurrent protection.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Solar, wind, and other forms of renewable energy are becoming more popular worldwide as an alternative energy source for a number of reasons including lower cost for production, increasing pollution from fossil fuels, and lack of other viable energy resources.

Currently, a user may purchase a product tailored to meet specific requirements. The user may specify the specific parts and buy a module tailored for the specified purpose. For example, there are several solar energy systems that may be purchased, but they include non-customizable circuitry and/or components.

In order to overcome the deficiencies of the prior art, a modular generic apparatus is disclosed herein that may be used to create a simple, safe, and user-friendly energy generation and storage system. The disclosed system supports receiving customizable power input and power output for energy generating systems and energy storage. Example embodiments may include essential elements of a customizable protective circuitry supporting modular integration of components in a "plug-and-play" fashion. By way of example, without any limitation implied, applications of the embodiments could include off-grid scenarios, on-grid scenarios, recreational vehicles, educational applications, and the like.

Embodiments of the apparatus may include a common modular circuit for integration of multiple components including (but not limited to) a direct current (DC) source (e.g. photovoltaic array) of varying voltage, a charge controller, a DC energy storage (e.g. battery bank), an alternating current (AC) inverter, a DC fuse block, a circuit disconnect, and a multimeter. The apparatus may also support user-friendly selection of components, assisted installation, and customization of circuitry, such as and fuses/breakers with varying amperage.

An overcurrent is a condition which exists in an electrical circuit when the normal load current is exceeded. The two basic forms of an overcurrent are overloads and short circuits. Fuses and circuits breakers primary role in a circuit is to protect personnel and equipment when dangerous overcurrent's do happen. A short-circuit is an overcurrent condition where an abnormal, low-resistance, circuit path is introduced into the circuit. This low-resistance path bypasses the normal load and can create extremely high currents (up to 1000× the normal current under some conditions). An overload is an overcurrent condition where the current exceeds the normal full load-capacity of the circuit but where no fault condition (short-circuit) is present. A momentary overload condition (also known as "in-rush" currents) may also occur when a circuit is first initialized due to capacitor charging and/or motor-startup.

Figure 1:
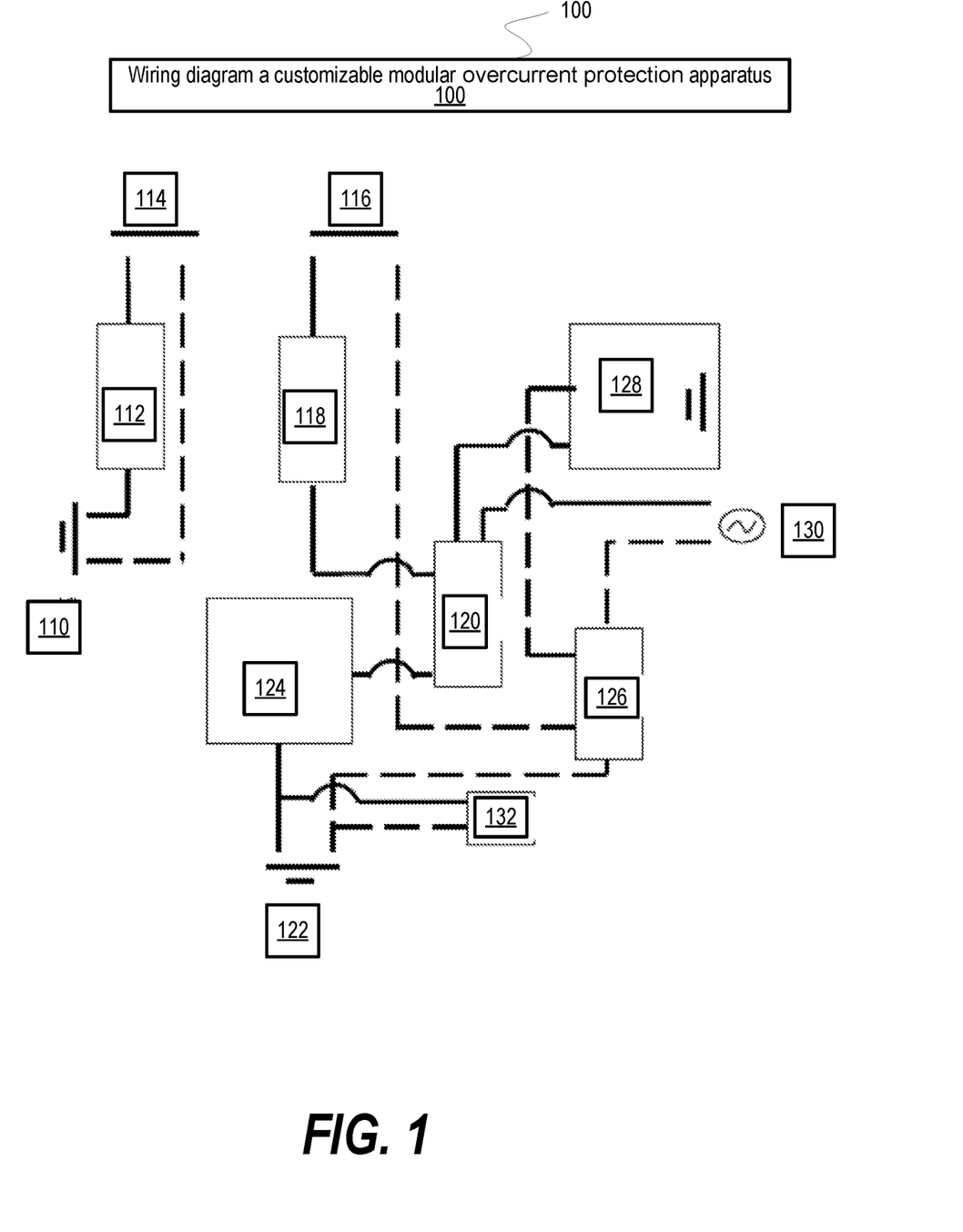
FIG. 1 shows a modular wiring diagram of a modular overcurrent protection apparatus.

FIG. 1 depicts an embodiment of a wiring diagram 100 of a customizable circuit. The apparatus includes an input 110 for DC current [for example, solar], thereafter current passes through an adaptable fuse/breaker 112 to a common DC output 114 and to a charge controller 116 of choice which may be defined by the user. The apparatus may also offer an input for DC current into the circuit from the charge controller 116 thereafter current flows through an adaptive fuse/breaker 118 onward to the main fuse/breaker 120 which is customizable based upon component amperage. In addition, the device may provide an output 122 for DC current storage and utilization (eg. battery bank) that is user defined based upon user selection and passes through a circuit disconnect 124, thereafter current passes to the adaptive main fuse 120. From the main fuse 120, the DC current passes to an integrated DC fuse block 128 and also a DC output for attachment of an AC inverter 130 per the user preference. In addition, a multimeter (volt, amp, watt) 132 may be available. All the negative terminals may be attached to the negative busbar 126. However, if the solar array DC output is already fused, then the corresponding segment may be bypassed. In addition, an embodiment of the device may incorporate electrical conduit allowing for varying amperage based upon user defined needs. In addition, the fuse/breaker components may be customizable in a "Plug and Play" fashion.

Figure 2:
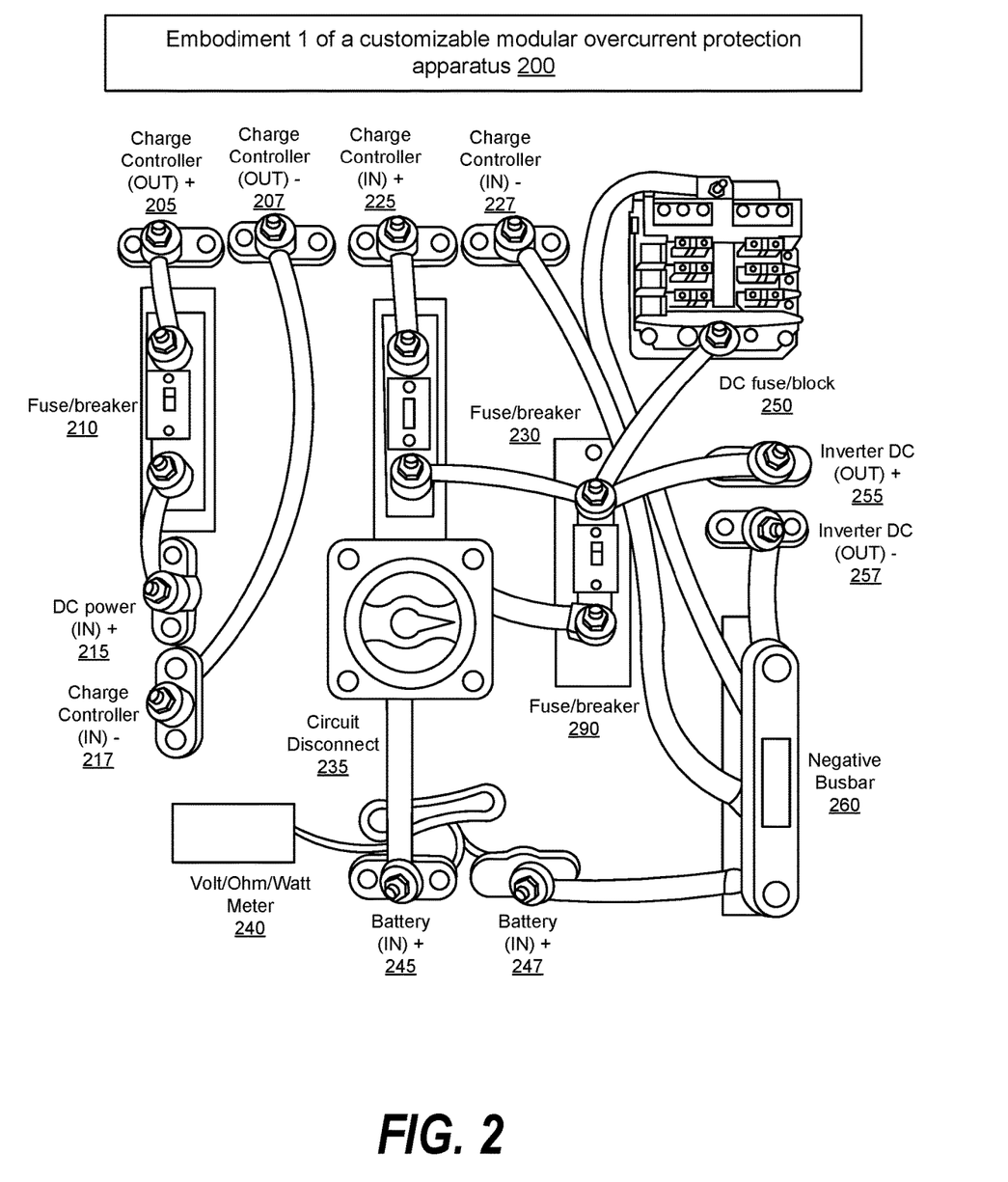
FIG. 2 shows a schematic view of embodiment 1 of a modular overcurrent protection apparatus.

FIG. 2 depicts embodiment 1 of a customizable modular overcurrent protection apparatus 200. The customizable overcurrent protection apparatus 200 includes various connection ports, such as, DC power (IN)– 217 operatively connected to charge controller (OUT)– 207. DC power (IN)+ 215 connected to fuse/breaker 210 connected to charge controller (OUT)+ 205. Charge controller (IN)+ 225 connected to fuse/breaker 230 operatively coupled to DC fuse/block 250, inverter DC out+ 255, fuse/breaker 290, circuit disconnect 235, and battery (IN)+ 245 which is connected to volt/ohm/watt meter 240. Charge controller (IN)– 227 connected to negative busbar 260 which is connected to battery (IN)– 247 and inverter DC out– 257.

Figure 3:
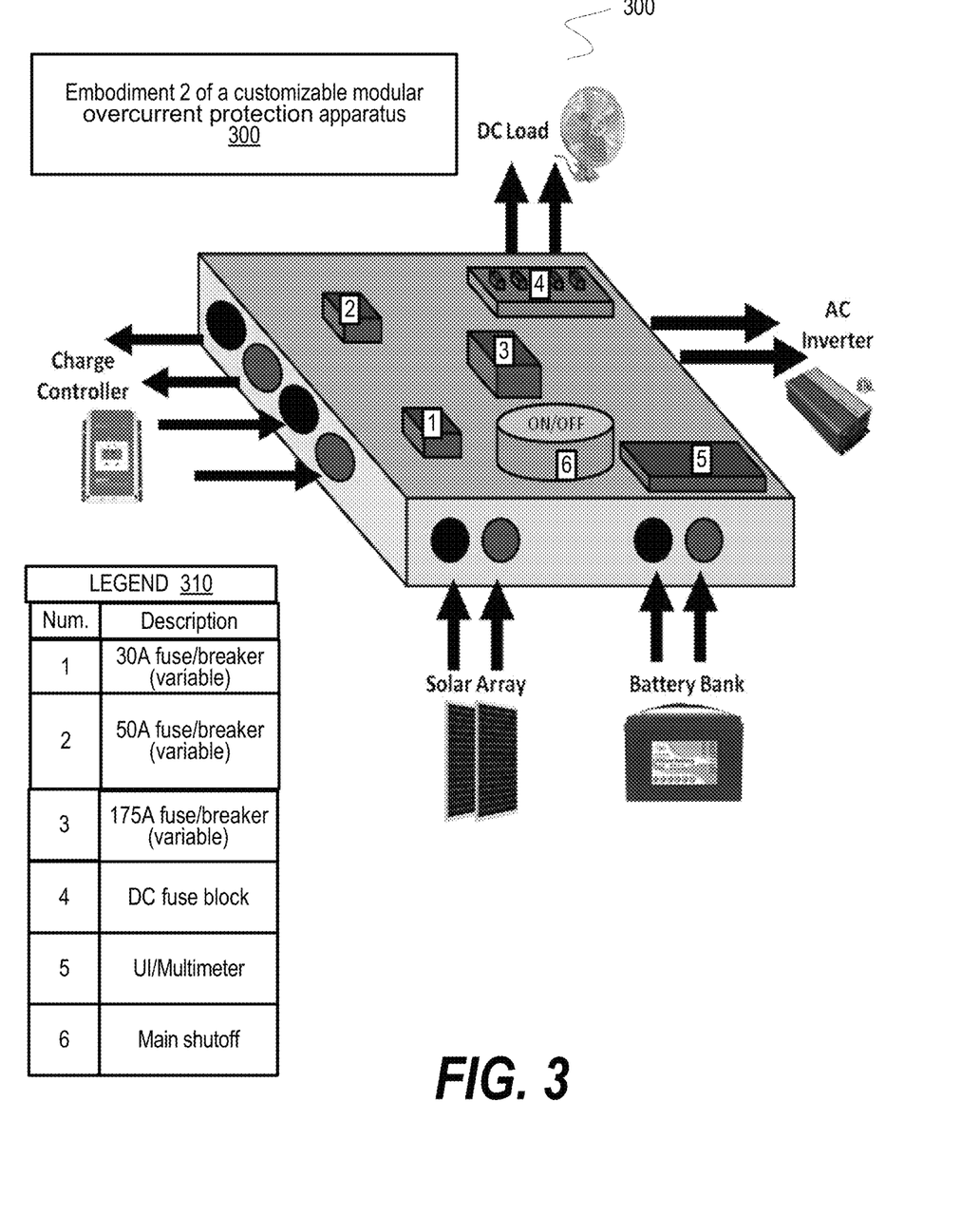
FIG. 3 shows a schematic view of embodiment 2 of a modular overcurrent protection apparatus.

FIG. 3 depicts a schematic view of embodiment 2 of a customizable modular overcurrent protection apparatus 300. The view depicts ports for the charge controller, solar array, battery bank, AC inverter and DC load. The numbered entries are documented in legend 310, where 1 is 30 A fuse/breaker variable, 2 is 50 A fuse/breaker variable, 3 is 175 fuse/breaker (variable), 4 is DC fuse block, 5 is UI/multimeter, and 6 is main shutoff.

For example, if a user desires a 3600 Watt 12 Volt solar generation system, the user may be planning to use a 400 watt solar panel array, a 40 A charge controller, a 3600 Watt battery bank and 1500 Watt AC inverter. Based upon these inputs by the user, the UI would calculate a 30 A fuse for fuse point #1 to allow proper over current protection of the solar array (note, this fuse point is optional if the solar array uses a fused combiner box, or in-line fuse), a 50 Amp fuse for fuse point #2 of charge controller, and a 175 Amp fuse for main fuse (fuse point #3) connecting battery bank to AC inverter and DC load in order to provide adequate over current protection. Of note, the UI calculations can change based upon user input of desired components. In addition, the communication interface would potentially allow for Web-enabled monitoring and real time updates of system components and circuitry. The user would only need to plug the above components (solar array, charge controller, battery bank and inverter) into the standardized ports located on the apparatus. The calculated fuses/breakers would be added to the apparatus by plugging in to the appropriate standardized fuse holder/breaker locations on the apparatus. The apparatus may provide a main shutoff switch to disable the apparatus.

Figure 4:
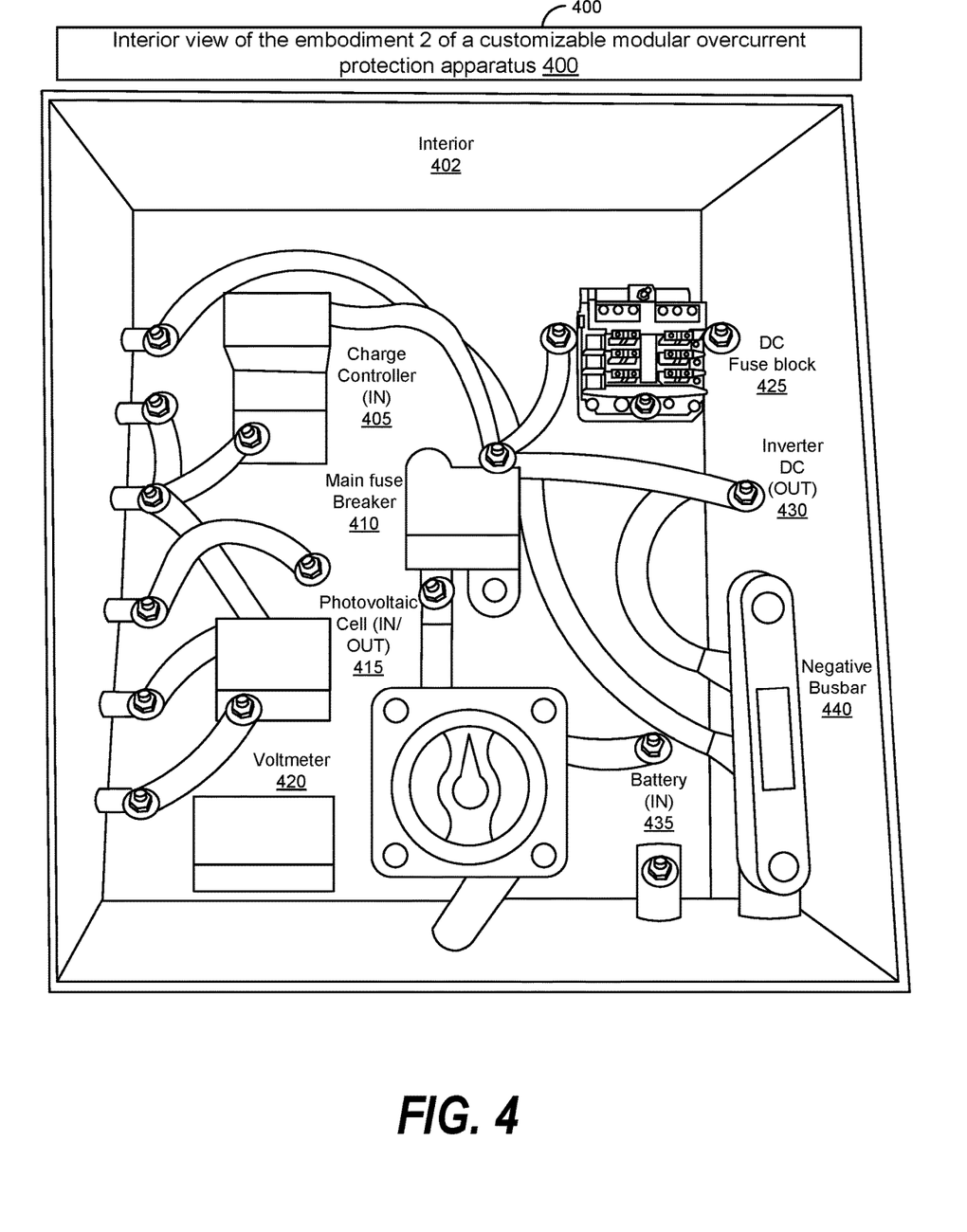
FIG. 4 shows an interior view of the embodiment 2 of a modular overcurrent protection apparatus.

FIG. 4 depicts the interior 402 of schematic view 400 of the embodiment 2 of the customizable modular overcurrent protection apparatus 300. The charge controller (IN) 405 has both positive and negative ports. The positive port of charge controller (IN) 405 is operatively connected to the main fuse breaker 410 which connected to the DC fuse block 425 and inverter DC out 430. The negative port of the charge controller (IN) 405 is operably connected to the negative busbar 440, battery (IN) 435, photovoltaic (IN/OUT) 415, and voltmeter 420.

Figure 5:
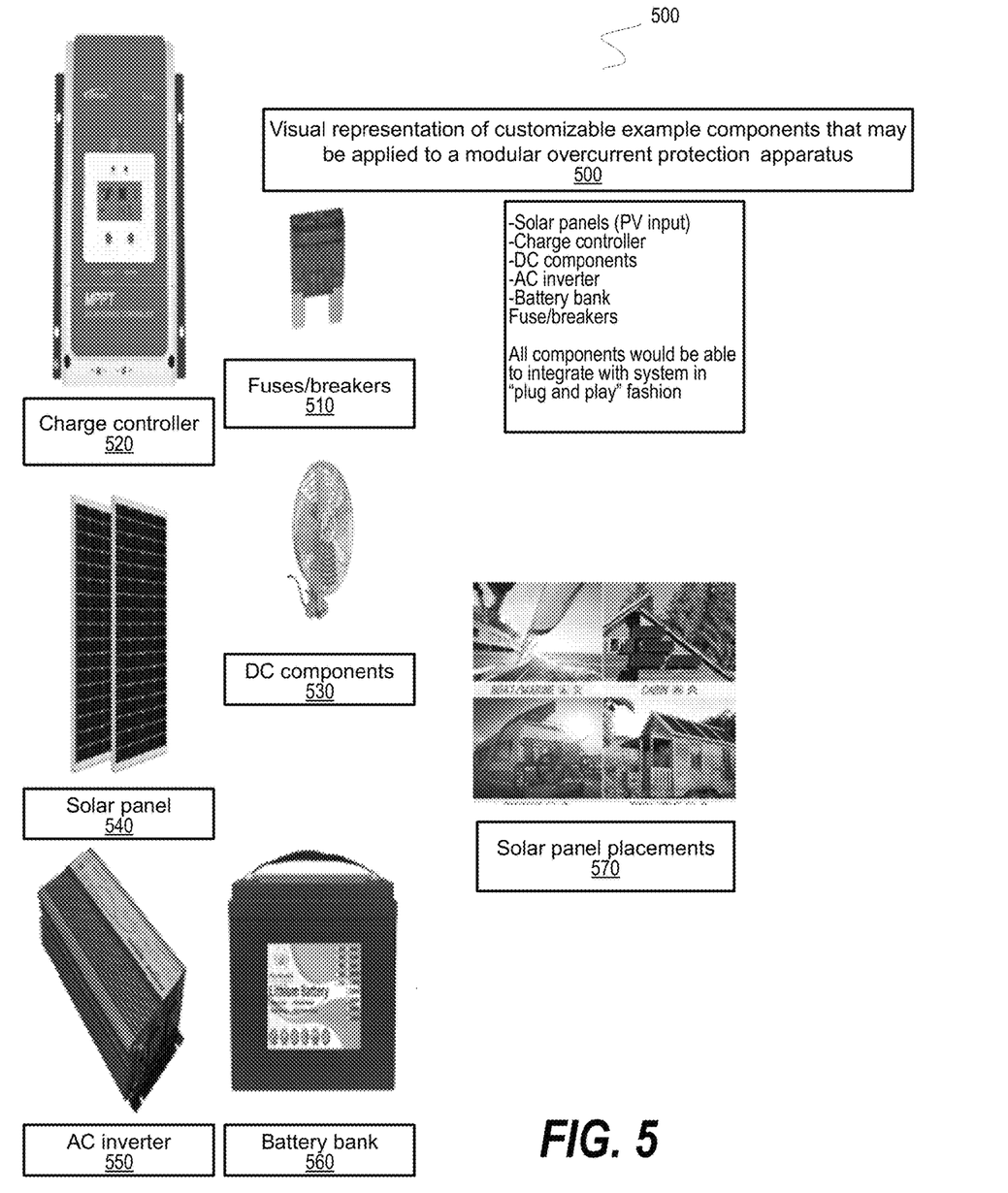
FIG. 5 shows a visual representation of example customizable components that may be applied to a modular overcurrent protection apparatus.

FIG. 5 depicts a visual representation of customizable components 500 that may be applied to the modular overcurrent protection apparatus. The customizable components 500 may include fuses/breakers 510, charge controller 520, DC components 530, solar panel 540, AC inverter 550, battery bank 560. Possible solar panel placements 570 are shown, for example, on roof tops. In an embodiment, components could be integrated with the apparatus in a "plug and play" fashion.

Figure 6:
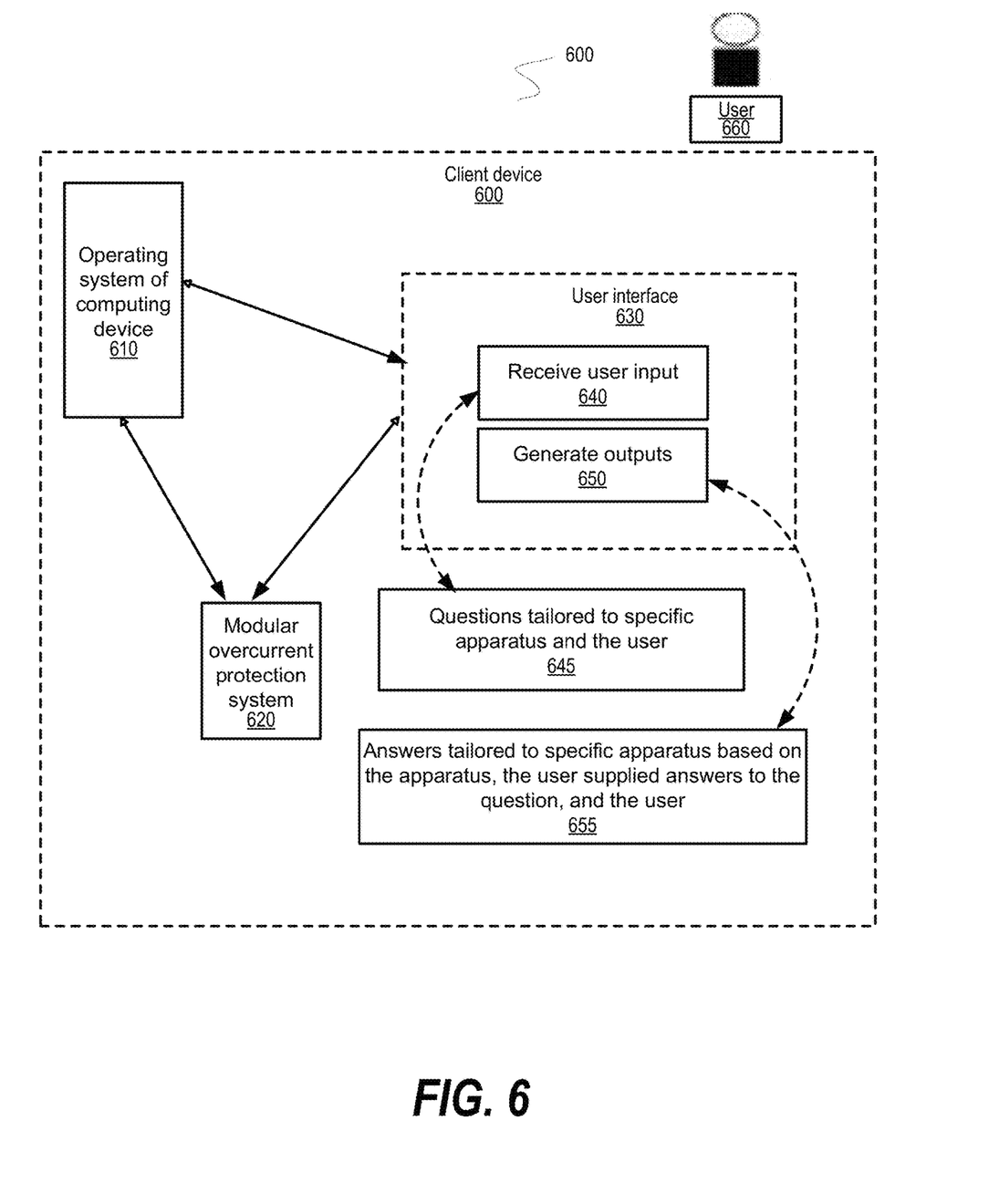
FIG. 6 shows a schematic view a user interface tailored to a modular overcurrent protection apparatus.

FIG. 6 depicts a client device 600 which run on an operating system of computing device 610, modular overcurrent protection system 620 supports user interface 630 which receive user input 640 from user 660, and responsive to receiving the user input 640, generates outputs 650. The questions may be tailored to the specific apparatus and user 645. The answers tailored to specific apparatus are based on the apparatus, the user supplied answers to the questions, and the user 655. The user interface 630 may be of any form. In an embodiment, the user interface may take a graphical form with menus allowing for selectable items. In a different embodiment, the user may enter values and support may be provided in a data base to look up items and offer characteristics that the user may select. The user interface 630 may also have crowd sourcing or artificial intelligence (AI) characteristics that allow for learning based on feedback from experts or multiple users. Support may include mining information about the user 645. In an embodiment, the user accesses the user interface 630 via a smart phone and retrieves information from the smart phone. The information could include social media postings, calendar, location access, weather application, and the like to derive intended usage of the apparatus. The user interface 630 may then be able to confirm intended usage of the apparatus from the user 645. The user interface 630 could be a simple command line interface using support like short message service (SMS) or even a voice response system. A user would be able to create a customized overcurrent protection generation and storage system which may be referenced herein as an apparatus. The apparatus may be an enclosure containing the required circuitry, the overcurrent protection, and a user interface to allow creation of a plug and play customizable energy generation and storage system. The integrated user interface would calculate appropriate overcurrent protection elements (or necessary solar components, in some embodiments) based upon user inputs.

For example, a user may desire a small 3600 Watt off-grid solar energy generation system based upon their anticipated load calculations. The apparatus may provide all required internal circuitry of varying current ratings in a printed circuit board (PCB) format along with over current protection elements to conjoin the solar components thus allowing for creation of the user defined system. In addition, the UI could be integrated into the apparatus (or external via software or application form) to be responsive to user input and suggest proper over current protection elements needed for desired system.

The over current protection elements would be readily available in the form of fuses or circuit breakers that attach to the apparatus in a plug and play fashion to defined location on the apparatus circuit board based upon UI recommended amperage ratings. The solar components would also attach to the apparatus at defined locations with plug and play compatibility.

The UI may suggest appropriate size components: solar panel, charge controller, battery bank, inverter, etc. The fuse/breakers would be adaptable and customizable based on the current load requirements as defined by the user. The apparatus may include a communication interface suitable for Web enabled monitoring, electronic notifications of system status, and/or remote control of system functions.

Determining appropriate overcurrent protection is a well-known engineering problem where Ohm's law applies. Ohm's law states that the current through a conductor between two points is directly proportional to the voltage across the two points. Introducing the constant of proportionality, the resistance, one arrives at the usual mathematical equation that describes this relationship: I=V/R, where I is the current in units of amperes, V is the voltage measured across the conductor in units of volts, and R is the resistance of the conductor in units of ohms.

The UI determines answers to the common engineering questions. Many will be determined by the specific embodiment of the supplied apparatus and be identified by default values. Examples of common engineering questions that may be assisted by interactions with the user may include, but are not limited to many of the following:

1. What is the normal operating current of the circuit?
    a. In order to select the right amperage of the fuse, the full-load steady-state current of the circuit at an ambient temperature of 25Q C (68Q F) is typically used. Once the current value is determined, then a fuse rating should be selected as to be 125% of this value (taken to the next standard value).
    b. For example, if the normal steady-state current is calculated to be 10 amps, then a 15 A fuse rating should be selected [10 amps×125%=12.5 amps, the next larger standard size is 15 A].
    c. It is important to note that if the fuse is intended to be used in an environment with possibly very high or low ambient temperatures, then the nominal fuse current would need to be sized significantly higher or lower.
2. What is the operating voltage?
    a. The basic rule of thumb is that the voltage rating of the fuse must always be higher than the voltage rating of the circuit that it is protecting.
    b. For example, if the circuit voltage is 24 volts, then the fuse voltage rating must be higher than 24 volts (yes . . . it can be 250 V, just so long as it's higher than the circuit voltage).
3. What is the operating ambient temperature?
    a. This may be determined by interactive questions to the user.
    b. A rule of thumb is that for every 20° C. higher or lower in temperature, the fuse should be re-rated higher or lower 10-15%.
4. What is the available short-circuit current?
    a. This may be determined by interactive questions to the user.
5. What is the maximum allowable $I^2t$?
    a. All overcurrent protective devices take a certain amount of "reaction time" when they open to clear a circuit fault. During the time it takes for the fuse to open, there is energy flowing through the fuse. That energy is measured in $I^2t$. There two parts to the fuse's "reaction time".
        i. The time it takes to melt the fuse element (also known as the melting time, Tm).
        ii. The time it takes to quench the electrical arc (also known as the arcing time, Ta). The total time open the fault is known as the total clearing time. Tc+Tm+Ta Many other common engineering questions may be determined by the apparatus being offered. For example, the apparatus may be a DC circuit and may be designed to handle one or more of the following rush currents, short-circuit protection, over-load protection with known physical size limitations.

The following are options regarding the mounting of the fuse in the circuit:

1. Fuse Clips—Fuse clips are relatively inexpensive and allow for field replaceability. Fuse clips are typically mounted on a PCB so any attempt at replacing the fuse will require opening of the piece of equipment by the user 655. Additionally, removing a fuse from a PCB without disconnecting the power source could lead to an electrical shock when touching the fuse. Fuse clips are available for all "tube" fuses as well as micro fuses. Typically, fuse clips are limited to 15 A of normal current. Fuse clips are generally not listed or recognized by any safety agencies.
2. Panel Mounted Fuse holders—Panel mounted fuse holders allow for easy access for the user 655 to replace the fuse in the field. The panel mount fuse holder is shock-safe meaning that the fuse is removed safely when the cap of the fuse holder is removed preventing the possibility of electrical shocks. Fuse holders are typically tested and approved by safety agencies such as UL and CSA. Fuse holders are typically available up to 30 A.
3. Fuse Blocks—Fuse blocks are like fuse clips however they do not need to be mounted on the PCB. Fuses mounted in fuse blocks are typically only accessible by opening the piece of equipment which could lead to electrical shocks if the equipment is not disconnected from the power source. Fuse blocks are one of the few methods to mount fuses of large amperage.
4. Inline Fuse Holders—Inline fuse holders are typically used as a part of a wire harness assembly or where no surface is available to secure another type of fuse mount. Inline fuse holders are generally available up to 100 A in lower voltage applications and up to 30 A in higher voltage applications.

Figure 7:
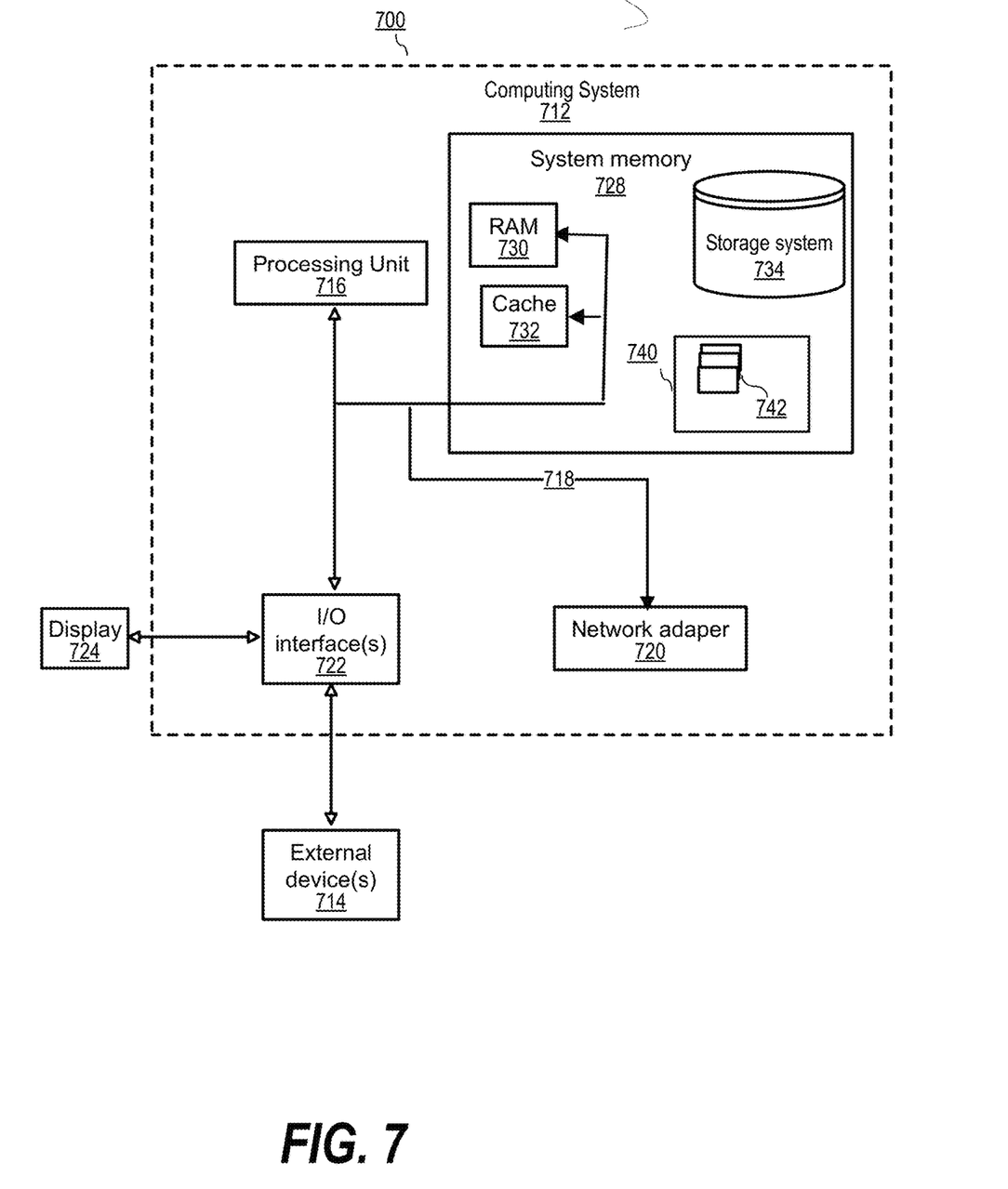
FIG. 7 shows a schematic view of a computing system.

Referring to FIG. 7, a schematic of a processing system 700 is shown wherein the methods of this invention may be implemented. The processing system 700 is only one example of a suitable system and is not intended to suggest any limitation as to the scope of use or functionality of embodiments of the invention described herein. Regardless, the system 700 can implement and/or performing any of the functionality set forth herein. In the system 700 there is a computer system 712, which is operational with numerous other general purpose or special purpose computing system environments or configurations. Examples of well-known computing systems, environments, and/or configurations that may be suitable for use with the computer system 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 712 may be described in the general context of computer system-executable instructions, such as program modules, being executed by a computer system. Generally, program modules may include routines, programs, objects, components, logic, data structures, and so on that perform tasks or implement abstract data types. The computer system 712 may be practiced in distributed cloud computing environments where tasks are performed by remote processing devices that are linked through a communications network. In a distributed cloud computing environment, program modules may be in both local and remote computer system storage media including memory storage devices.

As shown in FIG. 7, the computer system 712 in the system environment 700 is shown in the form of a general-purpose computing device. The components of the computer system 712 may include, but are not limited to, a set of one or more processors or processing units 716, a system memory 728, and a bus 718 that couples various system components including the system memory 728 to the processor 716.

The bus 718 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA) bus, the Micro Channel Architecture (MCA) bus, the Enhanced ISA (EISA) bus, the Video Electronics Standards Association (VESA) local bus, and the Peripheral Component Interconnects (PCI) bus.

The computer system 712 typically includes a variety of computer system readable media. Such media may be any available media that is accessible by the computer system 712, and it includes both volatile and non-volatile media, removable and non-removable media.

The system memory 728 can include computer system readable media in the form of volatile memory, such as random-access memory (RAM) 730 and/or a cache memory 732. The computer system 712 may further include other removable/non-removable, volatile/non-volatile computer system storage media. By way of example only, a storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 718 by one or more data media interfaces. As will be further depicted and described below, the system memory 728 may include at least one program product having a set (e.g., at least one) of program modules 742 that are configured to carry out the functions of embodiments of the invention.

A program/utility 740, having the set (at least one) of program modules 742, may be stored in the system memory 728 by way of example, and not limitation, as well as an operating system, one or more application programs, other program modules, and program data. Each of the operating systems may have one or more application programs, other program modules, and program data or some combination thereof, and may include an implementation of a networking environment. The program modules 742 generally carry out the functions and/or methodologies of embodiments of the invention as described herein.

The computer system 712 may also communicate with a set of one or more external devices 714 such as a keyboard, a pointing device, a display 724, a tablet, a digital pen, etc. wherein these one or more devices enable a user to interact with the computer system 712; and/or any devices (e.g., network card, modem, etc.) that enable the computer system 712 to communicate with one or more other computing devices. Such communication can occur via Input/Output (I/O) interfaces 722. These include wireless devices and other devices that may be connected to the computer system 712, such as, a USB port, which may be used by a tablet device (not shown). Still yet, the computer system 712 can communicate with one or more networks such as a local area network (LAN), a general wide area network (WAN), and/or a public network (e.g., the Internet) via a network adapter 720. As depicted, a network adapter 720 communicates with the other components of the computer system 712 via the bus 718. It should be understood that although not shown, other hardware and/or software components could be used in conjunction with the computer system 712. Examples include, but are not limited to microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method that includes a processor and a local storage device accessible by the processor for assisting a user with configuring an integrated circuit included in a plurality of boards with a customizable construction configured to integrate a solar generation system comprising:
   providing a user interface (UI) allowing a user to specify inputs to an apparatus and wherein the apparatus is an enclosure for integrating attachable modular customizable solar energy components coupled to the integrated circuit and wherein the integrated circuit includes customizable overcurrent protection elements selected from a group consisting of a breaker and a fuse for connecting user customizable plug and play components to the integrated circuit;
   responsive to the user utilizing the user interface by specifying the inputs and wherein the inputs include a plurality of overcurrent protection element locations and information to determine amperage at the plurality of overcurrent protection element locations, identifying requirements for at least one overcurrent protection element at least one location in the apparatus; and
   installing the at least one overcurrent protection element rated to achieve the identified requirements at the at least one location in the apparatus.

2. The method of claim 1, wherein the at least one location in the apparatus is selected from the group consisting of a first location between a plurality of solar panels and a charge controller, a second location between the charge controller and a battery bank, and a third location between the battery bank and an inverter further comprising: responsive to the user providing to the UI, solar panel data wherein the solar panel data includes a first solar panel with a first solar panel amperage and a first solar panel voltage, identifying the requirements for a first current overprotection element for the first location with a first current overprotection amperage rating at least 1.25 times the first solar panel amperage; responsive to the user providing to the UI, amperage for the charge controller, determining the requirements for a second current overprotection element at the second location with a second current overprotection amperage rating at least 1.25 times the amperage for the charge controller; and responsive to the user providing to the UI voltage and wattage for the inverter, determining current overprotection element at the third location by determining amperage as wattage divided by voltage and multiplying the amperage by at least 1.25.

3. The method of claim 2, wherein the UI further comprises:
collecting solar panel data including connection configuration wherein the connection configuration is one of series and parallel and at least two of: wattage, amperage and voltage;
calculating the overcurrent protection element at the first location for solar panels connected in series by adding voltage for each panel in the series and utilizing the amperage of the solar panels when each panel has a same amperage rating and a highest value of amperage for the each panel when a selected panel has a higher amperage rating than others in the series; and
calculating the overcurrent protection element at the first location for solar panels connected in parallel by adding amperage for each panel in the series and utilizing the voltage of the solar panels when each panel has a same voltage rating and a highest value of voltage for the each panel when a selected panel has a higher voltage rating than others in the series.

4. The method of claim 3, further comprising:
responsive to the user providing to the UI ambient temperature, adjusting the determined current overprotection element based on received ambient temperature.

5. The method of claim 1, wherein the apparatus includes at least two customizable overcurrent protection devices.

6. The method of claim 5, wherein the apparatus further comprises: a direct current (DC) fuse box with multiple slots for fuses.

7. The method of claim 6, wherein the apparatus supports an output to a plurality of DC storage and an alternating current (AC) inverter.

8. The method of claim 7, wherein a main breaker is between the DC storage, the DC fuse block, and the AC inverter.

9. The method of claim 1, wherein the apparatus includes a current disconnect and a multimeter.

10. The method of claim 1, wherein a DC input is a photovoltaic input.

11. The method of claim 1, wherein the integrated circuit utilizes printed circuit board (PCB) technology.

12. The method of claim 1, wherein the apparatus further comprises:
a communication interface.

13. The method of claim 12, wherein the communication interface is a transceiver suitable for a Web enabled monitoring, electronic notifications of system status, and remote control of system functions.

14. An information handling system for assisting a user with configuring an integrated circuit in a plurality of boards with a customizable construction configured to integrate a solar generation system comprising:
one or more processors;
a memory coupled to at least one of the processors;
a network interface that connects a local device to another device; and
a set of computer program instructions stored in the memory and executed by at least one of the processors in order to perform actions comprising:
providing a user interface (UI) allowing a user to specify inputs to an apparatus and wherein the apparatus is an enclosure for integrating attachable modular customizable solar energy components coupled to the integrated circuit and wherein the integrated circuit includes customizable overcurrent protection elements selected from a group consisting of a breaker and a fuse for connecting user customizable plug and play components to the integrated circuit;
responsive to the user utilizing the user interface by specifying the inputs and wherein the inputs include a plurality of overcurrent protection element locations and information to determine amperage at the plurality of overcurrent protection element,
identifying requirements for at least one overcurrent protection element at least one location in the apparatus; and
installing the at least one overcurrent protection element rated to achieve the identified requirements at the at least one location in the apparatus.

15. The information handling system of claim 14, wherein the at least one location in the apparatus is selected from the group consisting of a first location between a plurality of solar panels and a charge controller, a second location between the charge controller and a battery bank, and a third location between the battery bank and an inverter further comprising:
responsive to the user providing to the UI, solar panel data wherein the solar panel data includes a first solar panel with a first solar panel amperage and a first solar panel voltage, identifying the requirements for a first current overprotection element for the first location with a first current overprotection amperage rating at least 1.25 times the first solar panel amperage; responsive to the user providing to the UI, amperage for the charge controller, determining the requirements for a second current overprotection element at the second location with a second current overprotection amperage rating at least 1.25 times the amperage for the charge controller; and responsive to the user providing to the UI voltage and wattage for the inverter, determining current overprotection element at the third location by determining amperage as wattage divided by voltage and multiplying the amperage by at least 1.25.

16. The information handling system of claim 15, wherein the UI further comprises:
collecting solar panel data including connection configuration wherein the connection configuration is one of series and parallel and at least two of: wattage, amperage and voltage;
calculating the overcurrent protection element at the first location for solar panels connected in series by adding voltage for each panel in the series and utilizing the amperage of the solar panels when each panel has a same amperage rating and a highest value of amperage for the each panel when a selected panel has a higher amperage rating than others in the series; and calculating the overcurrent protection element at the first location for solar panels connected in parallel by adding amperage for each panel in the series and utilizing the voltage of the solar panels when each panel has a same voltage rating and a highest value of voltage for the each panel when a selected panel has a higher voltage rating than others in the series.

17. The information handling system of claim 16, wherein the apparatus includes at least two customizable overcurrent protection devices.

18. The information handling system of claim 14, further comprising:

responsive to the user providing to the UI ambient temperature, adjusting the determined current overprotection element based on received ambient temperature.

* * * * *